(12) United States Patent
Ratner

(10) Patent No.: US 10,062,093 B1
(45) Date of Patent: Aug. 28, 2018

(54) COMPANION ADVERTISEMENTS ON REMOTE CONTROL DEVICES

(71) Applicant: Google Inc., Mountain View, CA (US)

(72) Inventor: Simon Ratner, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/142,759

(22) Filed: Dec. 28, 2013

Related U.S. Application Data

(63) Continuation of application No. 13/478,067, filed on May 22, 2012.

(51) Int. Cl.
*G06Q 10/00* (2012.01)
*G06Q 30/02* (2012.01)

(52) U.S. Cl.
CPC .................. *G06Q 30/0269* (2013.01)

(58) Field of Classification Search
USPC ........................................ 705/14.64
See application file for complete search history.

(56) References Cited

U.S. PATENT DOCUMENTS

| | | | | |
|---|---|---|---|---|
| 5,831,664 A * | 11/1998 | Wharton et al. | ........ | H04N 7/163 345/156 |
| 7,055,168 B1 * | 5/2006 | Errico | ............... | H04N 7/163 348/E7.061 |
| 7,155,737 B1 * | 12/2006 | Lim et al. | ............... | G06F 21/33 709/223 |
| 7,712,125 B2 * | 5/2010 | Herigstad et al. | ..... | H04N 7/163 725/109 |
| 7,899,915 B2 * | 3/2011 | Reisman | ........... | G06F 17/30873 709/227 |
| 8,281,332 B2 * | 10/2012 | Rajaraman et al. | ............ | 725/32 |
| 8,433,306 B2 * | 4/2013 | Rodriguez | ............. | G06Q 30/02 455/3.06 |
| 8,468,056 B1 * | 6/2013 | Chalawsky | ................ | 705/14.42 |
| 8,589,234 B1 * | 11/2013 | Lee et al. | ................... | 705/14.71 |
| 8,645,995 B2 * | 2/2014 | Ferris et al. | ........... | H04H 20/33 348/552 |

(Continued)

OTHER PUBLICATIONS

Narasimhan, Nitya When the Shift Hits the (Television) Fan: A Growing Opportunity for Companion Devices, (Sep.-Oct. 2011) IEEE Internet Computing (vol. 15, Issue 5) (Year: 2011).*

(Continued)

*Primary Examiner* — Beth V Boswell
*Assistant Examiner* — Folashade Anderson
(74) *Attorney, Agent, or Firm* — Foley and Lardner LLP

(57) ABSTRACT

A companion advertisement is displayed on a control client which is also used to control the content being shown on a display client. The companion advertisement is related to a video or advertisement being displayed on the display client. Such a companion advertisement takes advantage of previously unused screen real estate and enables the user to interact with the advertisement or view further information without any interruption of the content being displayed on the display client. A server keeps the content displayed on the display client and control client synchronized. The server recognizes when a user is logged into both a display client and a control client and notifies the control client that an advertisement should be displayed. The control client then retrieves an advertisement related to the content on the display client.

20 Claims, 5 Drawing Sheets

(56) References Cited

U.S. PATENT DOCUMENTS

| | | | |
|---|---|---|---|
| 8,676,828 | B1 | 3/2014 | Agarwal et al. |
| 8,713,600 | B2 | 4/2014 | Shkedi et al. |
| 8,793,730 | B2 * | 7/2014 | Mowrey et al. ... H04N 5/44543 725/133 |
| 8,799,951 | B1 * | 8/2014 | Hamilton et al. . H04N 21/2668 725/12 |
| 9,292,250 | B2 | 3/2016 | Krig et al. |
| 9,386,345 | B2 * | 7/2016 | Malik ................ H04N 21/4126 |
| 2002/0100063 | A1 | 7/2002 | Herigstad et al. |
| 2004/0107437 | A1 * | 6/2004 | Reichardt .......... G06Q 30/0241 725/37 |
| 2008/0262914 | A1 * | 10/2008 | Suveyke et al. ................ 705/14 |
| 2009/0089141 | A1 * | 4/2009 | Lara et al. ...................... 705/10 |
| 2009/0187487 | A1 * | 7/2009 | Naito et al. ...................... 705/14 |
| 2010/0023966 | A1 * | 1/2010 | Shahraray et al. H04N 5/44543 725/34 |
| 2010/0082437 | A1 * | 4/2010 | Tamayama et al. ....... 705/14.58 |
| 2010/0083338 | A1 | 4/2010 | Chiang |
| 2011/0140840 | A1 * | 6/2011 | Hardacker et al. .......... 340/5.83 |
| 2011/0321107 | A1 * | 12/2011 | Banks ............ H04N 21/234363 725/110 |
| 2012/0089923 | A1 * | 4/2012 | Pettit ..................... G06F 9/4445 715/746 |
| 2012/0116869 | A1 * | 5/2012 | Vasudevan ......... G06Q 30/0241 705/14.44 |
| 2012/0120296 | A1 * | 5/2012 | Roberts ............. H04N 21/4126 348/333.12 |
| 2012/0252557 | A1 * | 10/2012 | Chow et al. .................... 463/25 |
| 2013/0054371 | A1 * | 2/2013 | Mason et al. .......... G06Q 30/02 705/14.64 |
| 2013/0227607 | A1 * | 8/2013 | Saltonstall et al. ............. 725/35 |
| 2014/0006174 | A1 * | 1/2014 | Pearcy et al. ............. 705/14.73 |
| 2014/0007211 | A1 * | 1/2014 | Yang ...................... H04L 63/08 726/7 |
| 2015/0339274 | A1 * | 11/2015 | Pappu ................ H04N 21/4126 715/205 |

OTHER PUBLICATIONS

United States Office Action, U.S. Appl. No. 13/478,067, dated Jul. 14, 2014, 18 pages.
United States Office Action for U.S. Appl. No. 13/478,067, dated Feb. 11, 2015, 22 pages.
Office Action on U.S. Appl. No. 13/478,067 dated Jun. 28, 2016.
Office Action dated Oct. 27, 2015.
Office Action dated Nov. 25, 2015.
U.S. Office Action on U.S. Appl. No. 13/478,067 dated Apr. 6, 2017.
U.S. Office Action on U.S. Appl. No. 13/478,067 dated Sep. 7, 2017.
U.S. Notice of allowance on U.S. Appl. No. 13/478,067 dated Dec. 12, 2017.

* cited by examiner

COMPANION ADVERTISEMENTS ON REMOTE CONTROL DEVICES

CROSS REFERENCE TO RELATED APPLICATIONS

This application is a continuation application of U.S. patent application Ser. No. 13/478,067, filed May 22, 2012, which is incorporated by reference herein in its entirety.

BACKGROUND

Field of the Invention

Described embodiments relate to the field of advertising on mobile computer devices, and in particular to displaying on a first device advertisements related to content displayed on a second device.

Description of the Related Art

Devices such as televisions made primarily for displaying media typically have limited navigation schemes including four directional keys and a select key. Such a navigation scheme limits the format and effectiveness of advertisements that can be displayed on the device. Lack of a web browser also limits the amount of interaction that can be had with an advertisement. Additionally, interaction with an advertisement often negatively affects playback on the display device by obscuring content or halting playback altogether. Often, advertisements on devices with limited navigations schemes are limited to in-stream video ads or non-interactive display ads.

As display devices become more advanced, other devices are increasingly able communicate with display devices and serve as remote controls. Similarly, advanced portable devices such as tablet computers, cellular phones and laptop computers are able to serve as these remote controls.

SUMMARY

A video hosting website includes videos available for viewing over the Internet or other network. The video hosting site tracks when a user is logged in on a device. Devices that a user can log in to include a display client and a control client. A display client is a device on which video is displayed. A control client is a device that selects or controls the video displayed on the display client. When a user is logged into a display client and a control client, the video hosting site enables the control client to control the display client. In one embodiment, a companion advertisement is displayed on the control client, the control client configured to control what is being presented on a display client and the companion advertisement associated with the display client. The video hosting site instructs the control client to display a companion advertisement and the control client retrieves an appropriate advertisement for display. In one embodiment, the companion advertisement is related to a video or advertisement being shown on the display client.

This companion advertisement can be displayed in addition to, or in place of, a primary advertisement on the display client. For example, the display client may show an overlay message or corner bug advertisement, while the control client shows a more detailed interactive advertisement. The companion advertisement may allow the user to click through to a website where a purchase can be made. Interaction with the companion advertisement can be encouraged by removing the primary advertisement from the display client in response to the interaction with the companion advertisement. A user can interact with a companion advertisement without affecting playback of media on the display client.

DETAILED DESCRIPTION

Figure 1:
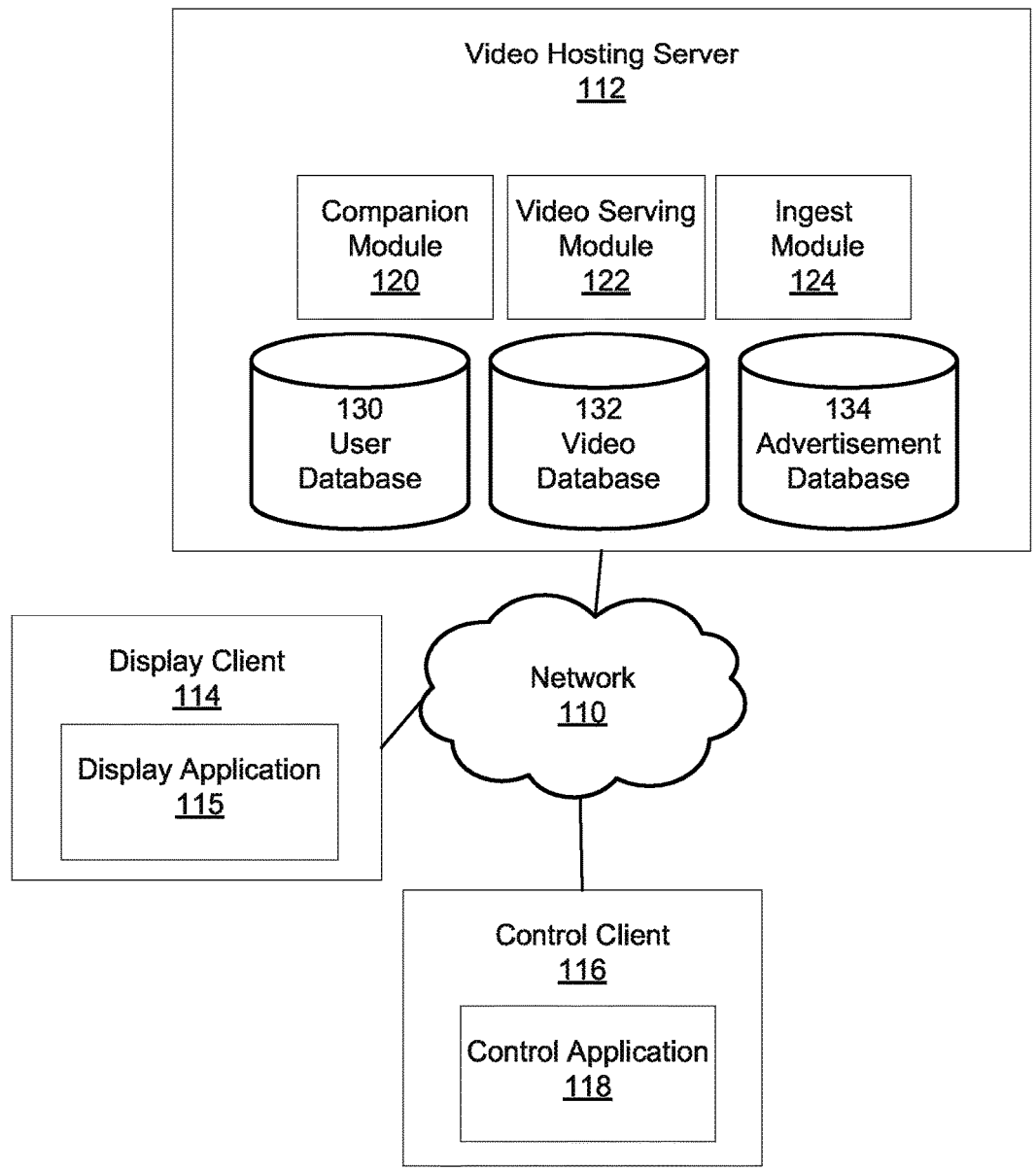
FIG. 1 is an illustration of a system for providing companion advertisements to control clients in accordance with an embodiment of the present invention.

FIG. 1 illustrates a system architecture of a video hosting server 112 in accordance with one embodiment. As shown in FIG. 1, the video hosting server 112 includes a companion module 120, a video serving module 122, an ingest module 124, a user database 130, a video database 132, and an advertisement database 134. Many conventional features, such as firewalls, load balancers, application servers, failover servers, site management tools and so forth are not shown so as not to obscure the features of the system. In general, functions described in one embodiment as being performed on the server side can also be performed on the client side in other embodiments if appropriate. In addition, the functionality attributed to a particular component can be performed by different or multiple components operating together.

The server is implemented as a server program executing on server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage mediums (e.g., RAM, hard disk, or optical/magnetic media).

The companion module 120 communicates with clients such as display client 114 and control client 116. Companion module 120 tracks the status of clients and informs the clients of whether they should display advertisements. In one embodiment, both display application 115 and control application 118 are the same version of a video application. In this case, a configurable setting in the video application allows the application to run as a control client or a display client. Alternatively, specialized video applications such as display application 115 and control application 118 will only allow a client to run as a display client or a control client. In one embodiment, companion module 120 determines when a user is logged in to both a display client 114 and control client 116. Companion module 120 associates clients that are logged in to by the same user.

Ingest module 124 receives and processes uploaded videos for storage in video database 132. This processing can include format conversion (transcoding), compression, metadata tagging, and other processing.

The video serving module 122 receives and responds to requests for videos and related information from clients. Video serving module 122 includes logic for searching the video database 132 in response to search requests, and for providing search results.

Advertisement database 134 contains advertisements in various formats that can be displayed in display applications 115 or control applications 118 executed on display client 114 or control client 116. Advertisement database 134 can also contain information indicating when certain advertisements should be displayed. For example, in one embodiment, an advertisement is displayed on the control client 116 only when a related advertisement is displayed on the display client 114. Various digital content items may be uploaded to the advertisement database 134 as advertisements. These advertisements may then later be transmitted to a display client 114 and/or control client 116.

The uploaded digital content items can include, for example, video, audio or a combination of video and audio. Alternatively, a digital content item may be a still image, such as a JPEG or GIF file or a text file. For purposes of convenience and the description of one embodiment, the uploaded digital content items will be referred to as a "video," "video files," or "video items," but no limitation on the type of digital content items that can be uploaded are indented by this terminology. Thus, the operations described herein can be applied to any type of digital content, not only videos; other suitable types of digital content items include audio files (e.g. music, podcasts, audio books, and the like), documents, websites, images, multimedia presentations, and so forth.

A display client 114 executes a display application 115 to view videos and can connect to the video hosting server 112 via a network 110, which is typically the Internet, but can also be any network, including but not limited to any combination of a LAN, a MAN, a WAN, a mobile, wire or wireless network, a private network, or a virtual private network. Similarly, a control client 116 executes a control application and connects to the video hosting server 112 via the network 110. While one display client 114 and one control client 116 are shown, it is understood that very large numbers (e.g., millions) of clients are supported and can be in communication with the video hosting server 112 at any time.

The display client 114 may include a variety of different computing devices. Examples of display client devices 114 are personal computers, televisions, set top boxes, Blu-ray players, media centers, and laptop computers. Any device that displays content and can be controlled by a control client is suitable for use as a display client 114. For discussion, it is assumed that display client 114 is a set top box connected to a television, though other devices such as those described above may be used in alternative embodiments as will be apparent to those of skill in the art. Display client 114 typically includes an operating system, for example the Google TV operating system by Google, Inc. of Mountain View, Calif.

The control client 116 may include a variety of different computing devices. Examples of control clients 116 are personal computers, digital assistants, personal digital assistants, mobile phones (including smart phones), and laptop computers. We assume for the remainder of this disclosure that control client 114 is a mobile phone, though other devices as described above may be used in alternative embodiments as will be apparent to those of skill in the art. For example, many suitable mobile devices from multiple manufacturers exist. One example of a mobile device is the Nexus S by Google, Inc. of Mountain View, Calif. Control client 116 typically includes an operating system, for example the Android operating system also by Google, Inc. In one embodiment, while the display client 114 and control client 116 are two distinct devices, certain devices may be able to serve as a display client or control client. For example, a tablet computer may serve as a display client controlled by a smart phone control client. At other times, the tablet computer may serve as a control client for a set top box display client.

The display application 115 is executed by or as part of the operating system of display client 114. The display application 115 allows users of client 114 to access video information and view videos from a remote server. In various embodiments, the display application 115 allows a user to access a video from the video hosting server 112 by browsing a catalog of videos, conducting searches on keywords, reviewing play lists from other users or the system administrator (e.g., collections of videos forming channels), or viewing videos associated with particular user groups. One suitable application is the Google TV application provided by Google, Inc.

Control application 118 is executed by or as part of the operating system of control client 116 enabling selection or control of video displayed on display client 114. Control application 118 enables functionality similar to that of display application 115. In one embodiment, the control application and display application are largely the same application adapted to a particular operating system. One suitable application for control application 118 is the YouTube Android 4.0 application provided by Google, Inc.

In one embodiment, control application 118 is in control mode when it is configured to control a display client connected to video hosting server 112. Similarly, a display application 115 is in full screen mode when it is configure to display video and receive control instructions from a control application. An application in full screen mode does not necessarily display videos on the entire screen, but merely a substantial portion of the screen.

Display and control applications report to video hosting server 112 when they have entered control mode or full screen mode. Video hosting server 112 monitors whether clients are in control mode or full screen mode. The clients 114 and 116 can include this information in any transmission to video hosting server 112 or in response to a request from video hosting server 112. Companion module 120 stores mode information in association database 310 (FIG. 3) and tracks whether a user is logged into a first display application in full screen mode and a second control application in control mode. If so, the clients are associated and the control client is allowed to control the display client. For exemplary purposes, we assume control application 118 on control client 116 is in control mode and display application 115 on display client 114 is in full screen mode. In one embodiment, no connection is established between display client 114 and control client 116. Instead, they communicate with video hosting server 112, which forwards any allowed communication destined for the other client. Alternatively, display client 114 and control client 116 can establish a a local area network connection, e.g., over a Wi-Fi network, to transmit information to one another.

Figure 2:
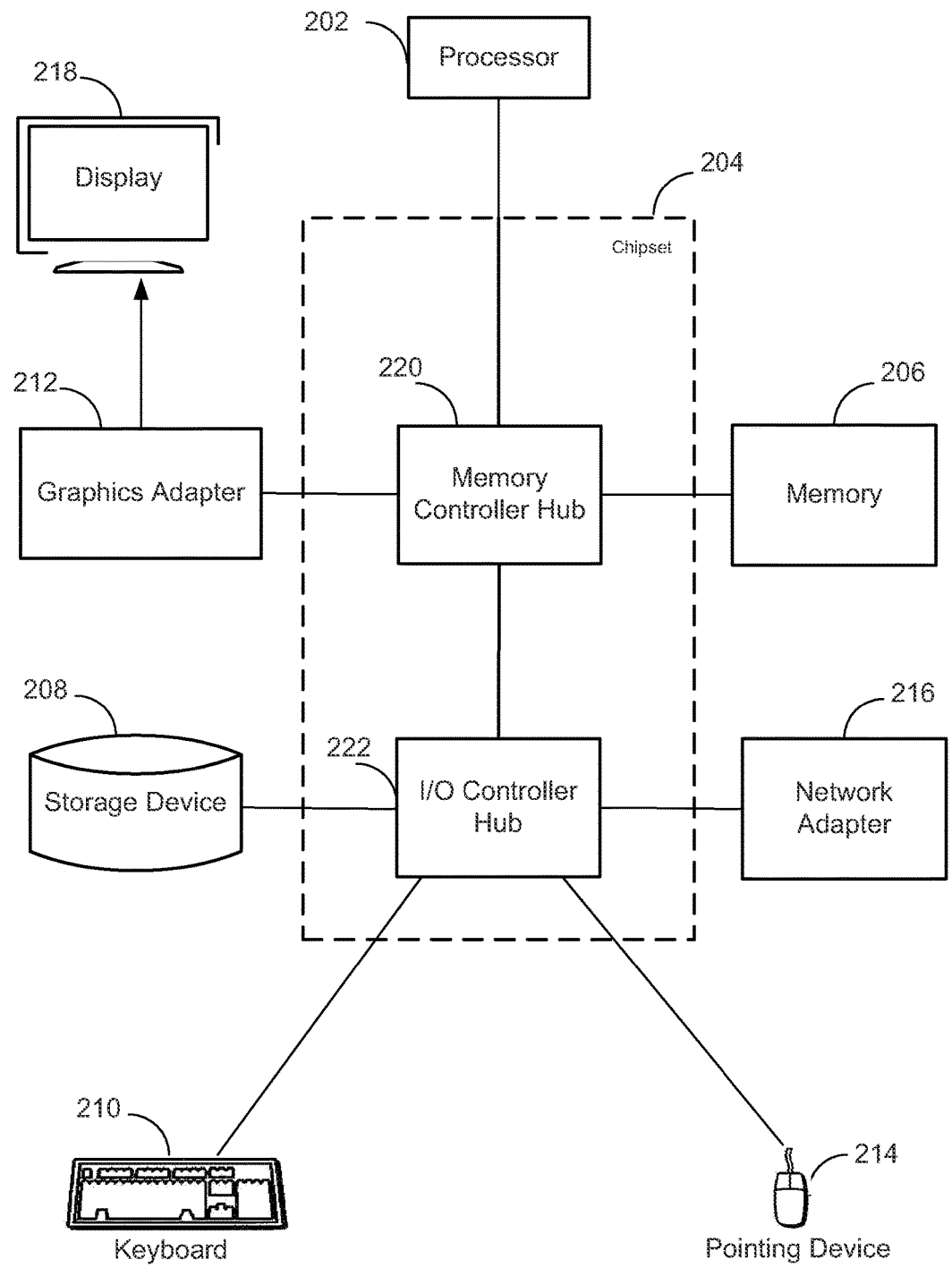
FIG. 2 is a high-level block diagram illustrating an example of a computer for use as a display client, control client or video hosting server, in accordance with one embodiment.

FIG. 2 is a high-level block diagram illustrating an example of a computer 200 for use as a display client 114, control client 116 and/or video hosting server 112, in accordance with one embodiment. Illustrated is at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer 200. The graphics adapter 212 displays images and other information on the display device 218. In some embodiments, the display device 218 includes touch screen capability for receiving user input and selections. The network adapter 216 couples the computer system 200 to the network 101. Some embodiments of the computer 200 have different and/or other components than those shown in FIG. 2. For example, the content server 112 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
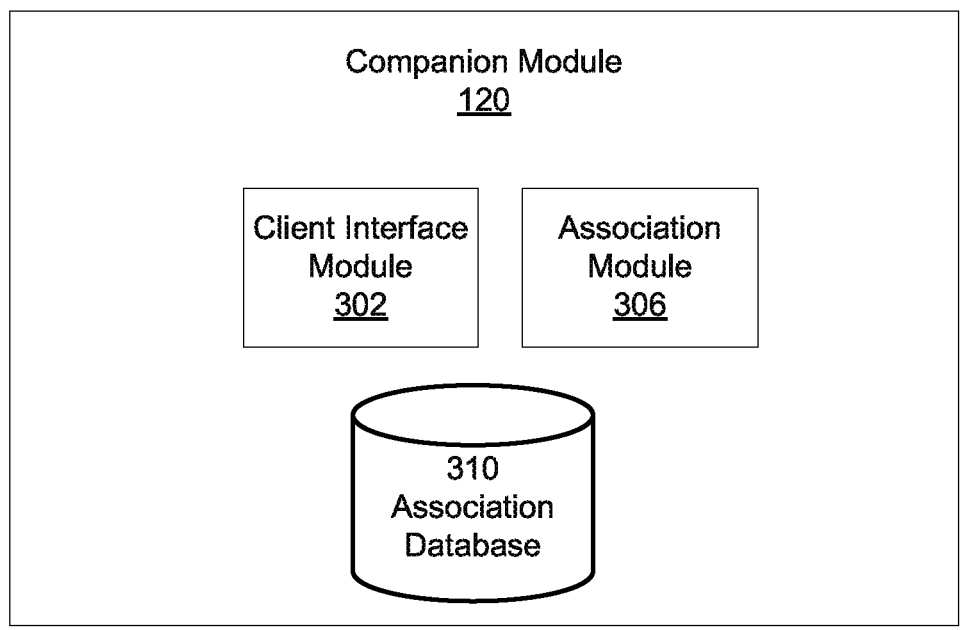
FIG. 3 is a more detailed block diagram of the companion ad module.

FIG. 3 is a block diagram of a companion module 120 in accordance with one embodiment. Companion module 120 includes a client interface module 302, association module 306, and association database 310. The client interface module 302 facilitates a connection between the video hosting server 112 and the display client 114 or control client 116. The client interface module 302 includes an API through which clients interface. When a client connects to the video hosting server 112 and is logged in as a registered user, determined by retrieving data from user database 130, a record of the active session is stored in the association database 310. The association database 310 keeps track of all display and control clients that are connected to the video hosting server 112. When a single registered user is logged in to multiple clients, the associated clients are stored in association database 310. Through client interface module 310, each of the clients reports whether they are in full screen mode or control mode. In one embodiment, when a client enters control mode, it is able to select which active associated client it would like to control. The selected client is referred to as the display client. In one embodiment, the display client is automatically put in full screen mode when selected as a display client by a control client. In another embodiment, the display client must activate full screen mode. Association module 306 monitors for whether a user is logged into both a control client in control mode and a display client in full screen mode. If so, a mapping is established from the control client to the display client and the control client is able to control the display client 114. The mapping indicates that control signals received from the control client are transmitted to the display client. Alternatively, all clients that are logged in to by a user and in control mode are configured to control all clients that are logged in to by the same user and in full screen mode. This configuration might be used as a "party mode", with multiple control clients able to add videos to a queue or playlist that is shown on a single display client. In one embodiment, party mode allows multiple control clients with various users logged in to control a single display client.

The control client 116 is capable of controlling the display client 114 by adjusting volume, pausing, playing and adjusting the current location in a video. In one embodiment, the control client 116 is capable of controlling all functions that the display client is able to perform. For example, control client 116 can search for and select individual videos which are to be played on the display client 114. Control client 116 can also create a playlist of videos which is sent to the display client 114.

In one embodiment, if display application 115 is terminated on display client 114, control client 116 reverts to stand alone mode and displays the most recent video displayed on display client 114. The control client 116 can open the most recent video from display client 114 at the same location in the video that display client 114 stopped displaying at.

Figure 4:
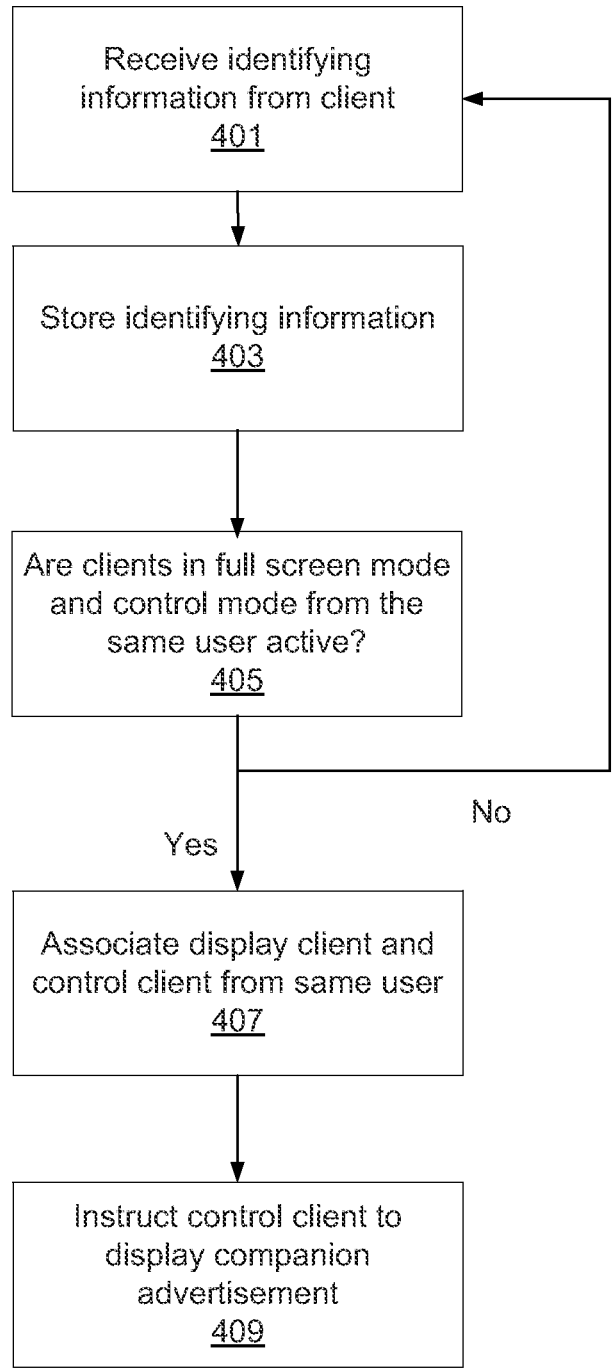
FIG. 4 is a flowchart illustrating a method for the video hosting server to distribute companion advertisements.

FIG. 4 describes steps performed by the companion module 120 of video hosting server 112 in one embodiment. The companion module 120 receives 401 identifying information from a client including notification of whether the client is in full screen mode or control mode and the registered user associated with the client. This identifying information can be sent as part of a request for video information from the client or any other transmission from the client. The companion module 120 then stores 403 the identifying information in the association database 310. The companion module 120 checks 405 whether a client in full screen mode and a client in control mode from the same registered user have been stored in the association database. If not, the companion module 120 again receives 401 identifying information from a client and continues the process described above. If a client in full screen mode and a client in control mode are found from the same user, the companion module 120 associates 407 the two clients as long as they remain active.

In one embodiment, the companion module 120 instructs 409 the control client to display a companion advertisement. This is triggered by the video hosting server determining that a companion advertisement is related to content displayed on the display device and that the control client is capable of displaying the companion advertisement. The advertisement information is retrieved from advertisement database 134. The companion advertisement is related to the video being displayed on the display client or a primary advertisement being displayed on the display client. In one embodiment, the control client requests a companion advertisement from the video hosting server 112 and the video hosting server identifies a suitable companion advertisement that is related to a video or advertisement displayed on the client. The companion advertisement can be displayed in addition to, or in place of, a primary advertisement on the display client. For example, the display client may show an overlay message as a primary advertisement, while the control client shows a more detailed interactive advertisement as the companion advertisement. In one embodiment, the companion advertisement provides a link that allows a user to visit a web page on the control client. This would allow a user to visit an advertiser's web page or make a purchase without interrupting playback occurring on the display client. Other companion advertisements might allow interactivity without affecting playback on the display client or leaving control application 118 on control client 116.

In one embodiment, the companion module 120 instructs the control client to display a companion advertisement, but does not send the companion advertisement that is to be displayed. The companion module 120 includes instructions, such as a URL, indicating where the companion advertisement can be retrieved by the control client 116. The companion module 120 ensures that the retrieved companion advertisement is related to the primary advertisement on the display client or the video presented on the display client. Alternatively, the companion module 120 sends the actual companion advertisement, rather than a location, to the control client.

Clients may be removed from the association database 310 when they are no longer in use by a user. This may occur if the companion module 120 receives notice of a user logging out on a client device. Clients may also be removed from the association database 310 if no activity has been detected in a certain amount of time.

In one embodiment, while displaying the companion advertisement, the control client 116 may report to the companion module 120 that the companion advertisement has been interacted with by the user. The companion module 120 can then instruct the display client 114 to remove a primary advertisement that is being displayed. This encourages interaction with a companion advertisement and can increase their effectiveness. In one embodiment, the control client 116 can report a user interaction directly to the display client 114.

Figure 5:
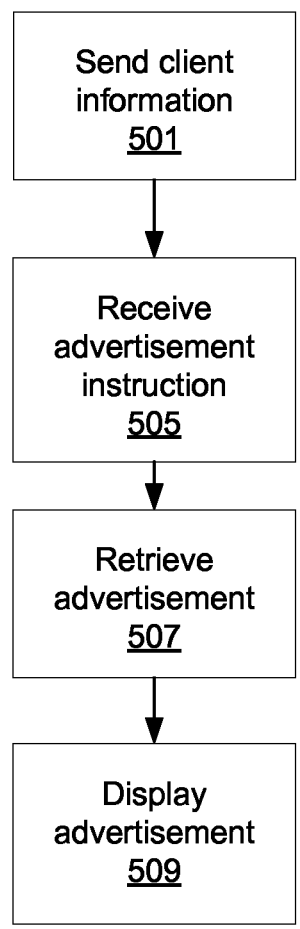
FIG. 5 is a flowchart illustrating a method for a control client to receive and display companion advertisements.

FIG. 5 describes steps performed by control client 116 to display a companion advertisement. The control client 116 sends 501 client information to the video hosting server 112. This client information includes data identifying the user of the client, requests for video information and status updates. Either as part of sending 501 client information, or as a standalone transmission, control client 116 sends mode information to companion module 120 indicating that the control client 116 is in control mode. In one embodiment, this step is unnecessary due to control client 116 running a control application 118 which always functions as if in control mode. Control client 116 then receives 505 instructions from companion module 120 to display a companion advertisement. The control client 116 then retrieves 507 the companion advertisement specified in the instructions from the companion module. Finally, the companion module displays 509 the companion advertisement.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the data collection module, scalar field processing module and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method comprising:
   transmitting, by a control client device to a content hosting system, identifying information, the control client device operable to control display of content on a display client device indirectly via the content hosting system via a first connection between the control client device and the content hosting system, the display client device separate from the control client device and communicating identifying information to the content hosting system via a second connection between the display content device and the content hosting system, wherein receipt of the identifying information from the control client device causes the content hosting system to match the identifying information transmitted by the display client device and the identifying information transmitted by the control client device with a user in an association database, and associate the display client device and the control client device with the user responsive to the matching;
   transmitting, by the control client device to the content hosting system via the first connection, a request for display content to be transmitted to the display client device, receipt of the request causing the content hosting system to transmit the display content to the display client device for display via the second connection;
   receiving, by the control client device from the content hosting system via the first connection, a companion advertisement identified by the content hosting system in a format compatible with the control client device, the companion advertisement related to the display content; and
   displaying, by the control client device, the received companion advertisement.

2. The method of claim 1, wherein the display content is a video related to the companion advertisement.

3. The method of claim 1, wherein the display content is a primary advertisement displaying branding similar to branding of the companion advertisement.

4. The method of claim 1, wherein the companion advertisement is interactive on the control client device.

5. The method of claim 4, wherein user interactions with the companion advertisement on the control client device do not affect playback of the display content on the display client device.

6. The method of claim 4, further comprising directing a web browser to navigate to a specific URL (uniform resource locator), by the control client device, responsive to detection of a user interaction with the display of the companion advertisement by the control client device.

7. The method of claim 1, wherein the identifying information transmitted by the display client device comprises login information of the user that is verified by a server.

8. The method of claim 1, wherein the companion advertisement is identified in response to the request for a companion advertisement from the control client device.

9. The method of claim 1, wherein a plurality of control client devices are associated with the display client device and operable to control, via the content hosting system, the display of content on the display client device.

10. The method of claim 1, wherein the display content is a series of videos and the request from the control client device via the first connection for display content to be transmitted to the display client device comprises data on a selection of videos in the series of videos selected using the control client device.

11. A computer system comprising:
    a control client device, in communication with a content hosting system via a first connection, the control client device comprising one or more computer processors configured to:
       transmit, to the content hosting system via the first connection, identifying information, the control client device operable to control display of content on a display client device indirectly via the content hosting system via the first connection between the control client device and the content hosting system, the display client device separate from the control client device and communicating identifying information to the content hosting system via a second connection between the display content device and the content hosting system, wherein receipt of the identifying information from the control client device causes the content hosting system to match the identifying information transmitted by the display client device and the identifying information transmitted by the control client device with a user in an association database, and associate the display client device and the control client device with the user responsive to the matching;
       transmit, to the content hosting system via the first connection, a request for display content to be transmitted to the display client device, receipt of the request causing the content hosting system to transmit the display content to the display client device for display via the second connection;
       receive, from the content hosting system via the first connection, a companion advertisement identified by the content hosting system in a format compatible with the control client device, the companion advertisement related to the display content; and
       display the received companion advertisement.

12. The computer system of claim 11, wherein the display content is a video related to the companion advertisement.

13. The computer system of claim 11, wherein the display content is a primary advertisement displaying branding similar to branding of the companion advertisement.

14. The computer system of claim 11, wherein the companion advertisement is interactive on the control client device.

15. The computer system of claim 14, wherein user interactions with the companion advertisement on the control client device do not affect playback of the display content on the display client device.

16. The computer system of claim 14, wherein the control client device is further configured to direct a web browser to navigate to a specific URL (uniform resource locator), responsive to detection of a user interaction with the display of the companion advertisement by the control client device.

17. The computer system of claim 11, wherein the identifying information transmitted by the display client device comprises login information of the user that is verified by a server.

18. The computer system of claim 11, wherein the companion advertisement is identified in response to the request for a companion advertisement from the control client device.

19. The computer system of claim 11, wherein a plurality of control client devices are associated with the display client device and operable to control, via the content hosting system, the display of content on the display client device.

20. The computer system of claim 11, wherein the display content is a series of videos and the request from the control client device via the first connection for display content to be transmitted to the display client device comprises data on a selection of videos in the series of videos selected using the control client device.

* * * * *